US011935390B2

(12) United States Patent
Munuera

(10) Patent No.: US 11,935,390 B2
(45) Date of Patent: Mar. 19, 2024

(54) FIRE DETECTION SYSTEM AND METHOD FOR IDENTIFYING A SOURCE OF SMOKE IN A MONITORED ENVIRONMENT

(71) Applicant: Carrier Corporation, Palm Beach Gardens, FL (US)

(72) Inventor: Jose Manuel Munuera, Barcelona (ES)

(73) Assignee: CARRIER CORPORATION, Palm Beach Gardens, FL (US)

(*) Notice: Subject to any disclaimer, the term of this patent is extended or adjusted under 35 U.S.C. 154(b) by 0 days.

(21) Appl. No.: 17/501,544

(22) Filed: Oct. 14, 2021

(65) Prior Publication Data

US 2022/0157154 A1 May 19, 2022

(51) Int. Cl.
*G08B 29/04* (2006.01)
*G08B 17/117* (2006.01)

(52) U.S. Cl.
CPC .......... *G08B 29/043* (2013.01); *G08B 17/117* (2013.01)

(58) Field of Classification Search
CPC .... G08B 29/043; G08B 17/10; G08B 17/117; G08B 17/00
See application file for complete search history.

(56) References Cited

U.S. PATENT DOCUMENTS 6,107,925 A * 8/2000 Wong .................... G08B 29/20 340/630
2008/0211678 A1* 9/2008 Andres ................ G08B 29/183 340/603
2015/0362370 A1* 12/2015 Abuhasel .............. G01J 5/0014 702/24
2022/0172591 A1* 6/2022 Solis Vidal .......... G08B 17/117

FOREIGN PATENT DOCUMENTS

KR 102054935 B1 12/2019
WO 2005119618 A2 12/2005

OTHER PUBLICATIONS

European Search Report for Application No. 20383005.4; dated Apr. 30, 2021; 8 Pages.

* cited by examiner

*Primary Examiner* — Mirza F Alam
(74) *Attorney, Agent, or Firm* — CANTOR COLBURN LLP

(57) ABSTRACT

A fire detection system for monitoring a monitored environment includes a smoke detector configured to determine a concentration of smoke in a sample of air from the monitored environment; a gas sensor configured to determine a concentration of a predetermined gas in the sample of air, the predetermined gas is one of carbon monoxide, carbon dioxide, nitrogen dioxide and sulphur dioxide; and a control module in communication with the smoke detector and the gas sensor; the control module is configured to identify a source of the smoke based on the concentration of smoke and the concentration of the predetermined gas; and the source of the smoke is identified to be a non-fire source when the concentration of the predetermined gas in the sample of air is below a first threshold.

7 Claims, 4 Drawing Sheets

FIRE DETECTION SYSTEM AND METHOD FOR IDENTIFYING A SOURCE OF SMOKE IN A MONITORED ENVIRONMENT

FOREIGN PRIORITY

This application claims priority to European Patent Application No. 20383005.4, filed Nov. 18, 2020, and all the benefits accruing therefrom under 35 U.S.C. § 119, the contents of which in its entirety are herein incorporated by reference.

TECHNICAL FIELD

The present disclosure relates to a fire detection system for monitoring a monitored environment and a method of determining a source of smoke in a monitored environment.

BACKGROUND

Fire detection systems are systems which detect fires within an environment monitored by the fire detection system. Appropriate action may then be taken in response to the detection of a fire within the monitored environment. Fire detection systems usually detect fires by detecting smoke, which is a common indicator of a fire within the monitored environment. However, fire detection systems are often not able to discriminate between sources of smoke within the environment they monitor, and an alarm may be generated when smoke is detected from a source which does not require action, or is not of any significant danger to the monitored environment and any occupants within. These sources may be regarded as nuisance sources, as they trigger an alarm or response from the fire detection system when no alarm or response is desired and/or required. Examples of nuisance sources may include cooking sources, including foodstuffs which when cooked or heated may produce smoke in a kitchen or otherwise, and other sources which may falsely trigger smoke detectors, such as cigarette smoke.

As fire detection systems presently available on the market are not able to discriminate between sources of smoke from fires against which action should be taken and nuisance sources such as cooking sources, a user or operator may be alerted to a fire when no action is required. This may lead to one or more persons disabling or disconnecting of fire detection systems from the environments from which they monitor, which accordingly may endanger the residents or occupants of buildings which use these fire detection systems.

Additionally, new safety standards are being introduced in various territories which require fire detection systems to be able to discriminate between cooking sources and other sources. Such a certification standard is defined by UL 268, 7th Edition, UL Standard for Safety Smoke Detectors for Fire Alarm Systems.

Accordingly, it is an objective of at least the described embodiments of the present invention to provide a fire detection system and method for identifying a source of smoke in a monitored environment.

SUMMARY

Viewed from a first aspect of the present invention there is provided a fire detection system for monitoring a monitored environment, the system comprising: a smoke detector configured to determine a concentration of smoke in a sample of air from the monitored environment; a gas sensor configured to determine a concentration of a predetermined gas in the sample of air, wherein the predetermined gas is one of carbon monoxide, carbon dioxide, nitrogen dioxide and sulphur dioxide; and a control module in communication with the smoke detector and the gas sensor; wherein the control module is configured to identify a source of the smoke based on the concentration of smoke and the concentration of the predetermined gas; and wherein the source of the smoke is identified to be a non-fire source when the concentration of the predetermined gas in the sample of air is below a first threshold.

By determining the concentrations of both smoke and at least one of these predetermined gases in the sample of air from the monitored environment, the control module is able both detect smoke and identify what the source of the smoke may be, if detected. In particular, the predetermined gas being one of carbon monoxide, carbon dioxide, nitrogen dioxide and sulphur dioxide means that many potential sources of the smoke may be distinguished based on the concentration of the predetermined gas determined, given that varying sources produce differing concentrations of the predetermined gas during combustion.

Advantageously, it has been recognised that a non-fire smoke source will typically produce a detectably lower concentration of these predetermined gases in the air than a fire source. Therefore, non-fire sources or nuisance sources may be readily discriminated from fire sources, or sources which require action. As such the fire detection system may be reliable in its detection of fires whilst not alerting occupants of the monitored environment or the like to non-fire sources, or nuisance sources.

The control module may be configured to determine the presence of a possible fire source based on the concentration of smoke in the sample of air determined by the smoke detector, for example when the concentration of smoke exceeds a predetermined threshold. The control module may be configured to identify the source of the smoke responsive to determining the presence of a possible fire source. The gas sensor may be configured to determine the concentration of the predetermined gas in the sample of air responsive to determining the presence of a possible fire source. The first threshold for the predetermined gas may be based on the concentration of smoke detected by the smoke detector.

A possible fire event, e.g. the production of smoke via combustion, may always be detected following the detection of smoke, but the response of the fire detection system may differ according to the identification of source of the smoke.

The predetermined gas is one of carbon monoxide, carbon dioxide, nitrogen dioxide and sulphur dioxide. Each of these gases may be produced in varying amounts by different sources of smoke during combustion. Each of these gases are generally produced in low concentrations by non-fire, or nuisance, sources. Thus whilst by detecting smoke by using the smoke detector may simply detect a fire, identifying the source of the smoke based on the concentration of the predetermined gas in the sample of air provides further signals or characteristics of the source of the smoke which may be used to identify the source of the smoke.

The control module may be configured to compare the concentration of smoke and the concentration of the predetermined gas to a plurality of predetermined concentrations associated with a plurality of known smoke sources. The control module may be configured to select one of the plurality of known smoke sources as the source of the smoke based on the comparison.

The predetermined gas sensor configured to determine a concentration of the predetermined gas in the sample of air may allow the control module to identify the source of the smoke by discriminating between known sources according to concentrations of the predetermined gas that the known sources produce during combustion. The concentrations of the predetermined gas that the known sources produce may be found experimentally.

The selection of one of the plurality of known smoke sources as the source of the smoke may be based on a number of criteria. For example, comparing the concentration of smoke and the concentration of the predetermined gas to predetermined concentrations associated with a plurality of known smoke sources may comprise comparing the determined concentrations in the sample of air to threshold values of the predetermined concentrations associated with the plurality of known smoke sources. When the determined concentration of smoke and the determined concentration of predetermined gas are found to lie within a range of values associated and/or corresponding to the predetermined concentrations of one of the plurality of known sources, that known source may be selected as the source of the smoke. The ranges of values associated with the predetermined concentrations of each of the plurality of known sources may be defined by upper and lower concentration thresholds. Alternatively, the selection may comprise selecting one of the plurality of known smoke sources of which the predetermined concentrations are closest in value to the concentration of smoke and the concentration of predetermined gas in the sample of air.

The concentration of smoke determined in the sample of air and/or the concentration of predetermined gas in the sample of air may be determined to a precision of at least ±2%; ±5%±8% or ±10%. The concentration of smoke determined in the sample of air and/or the concentration of predetermined gas in the sample of air may be determined to a precision of at least: ±0.05 ppm; ±0.10 ppm; ±0.15 ppm or ±0.20 ppm. The concentration of smoke determined in the sample of air may be determined to a sensitivity of at least: ±0.001% obs/m; ±0.002% obs/m; ±0.003% obs/m; ±0.004% obs/m or ±0.005% obs/m. Alternatively, the concentration of smoke and/or the concentration of predetermined gas in the sample of air may be determined to be above a set value according to a threshold response of the respective detector and/or sensor.

The control module may be configured to identify that source of the smoke as a fire source when the concentration of the predetermined gas in the sample of air exceeds the first threshold.

The control module may be configured to identify if the source of the smoke is a fire source. The control module may also be configured to identify what type of fire source the source of the smoke is. The control module may be configured to identify what type of fire source the source of the smoke is based on the concentration of the predetermined gas.

For example, whilst a fire source may be generally identified when the concentration of the predetermined gas in the sample of air is above the first threshold, particular fire sources may be identified as being the source of the smoke when the concentration of the predetermined gas exceeds further thresholds. These further thresholds may relate to predetermined concentrations associated with a plurality of known smoke sources. As such, the control module may be configured to identify one of the plurality of known smoke sources as the source of the smoke based on a comparison of the concentration of the predetermined gas in the sample of air to one or more additional thresholds.

The source of the smoke may be identified to be an organic fire source when the concentration of the predetermined gas in the sample of air exceeds the first threshold and does not exceed a second threshold. The second threshold may be greater than the first threshold.

The source of the smoke may be identified to be a liquid fuel source when the concentration of the predetermined gas in the sample of air exceeds the second threshold and does not exceed a third threshold. The third threshold may be greater than the second threshold.

The source of the smoke may be identified to be a synthetic fire source when the concentration of the predetermined gas in the sample of air exceeds the third threshold.

By discriminating not only between fire sources and non-fire sources, but also between different types of fire source based on the concentration of predetermined gas, the fire detection system may be able to identify specific fire sources as being the source of the smoke. Accordingly, appropriate action in response to the detection of smoke, and potentially a fire source, may be undertaken sooner after the fire started. The safety of the monitored environment may be improved, and damage caused whilst determining an appropriate response to a fire may be mitigated.

Non-fire sources may include cooking sources, cigarette smoke or the like.

Organic fire sources may include solid organic materials such as wood, paper, cotton, cloth and the like.

Liquid fuel sources may include gasoline, diesel, kerosene and the like.

Synthetic fire sources may include synthetic oils, polyurethane and other polymeric compounds and the like.

The plurality of known smoke sources may include one or more non-fire sources, organic fire sources, liquid fuel sources and synthetic fire sources.

A source of the smoke may generally be detected when a determined concentration of smoke exceeds a smoke detection threshold.

The source of the smoke is identified based on the concentration of smoke in the sample of air, as well as the concentration of the predetermined gas in the sample of air. The concentration of smoke in the sample of air may be used to at least in part identify the source of the smoke in a number of ways.

For example, the control module may be configured to identify the source of the smoke at least in part by determining a presence of the source of the smoke, based on the concentration of smoke in the sample of air. Additionally or alternatively, the source of the smoke can also be identified at least in part based on whether the concentration of smoke in the sample of air exceeds one or more smoke thresholds. For example, smouldering fires, i.e. fires which produce smoke without a flame, may produce greater amounts of smoke than non-smouldering fires. Smouldering fires may be produced by organic materials. Smouldering fires may also be produced by synthetic materials comprising fire retardant materials or synthetic materials which have undergone fire retardant treatments. Thus the control module may be configured to discriminate between certain non-fire sources and certain fire sources based on the concentration of smoke in the sample of air.

The source of the smoke may be identified to be a smouldering smoke source when the concentration of smoke in the sample of air exceeds a first smoke threshold. The source of the smoke may be identified as a non-smouldering smoke source when the concentration of smoke in the sample of air does not exceed the first smoke threshold. The first smoke threshold may be greater than the smoke detection threshold.

The control module may be configured to identify if the source of the smoke is a smouldering smoke source. The control module may be configured to identify if the source of the smoke is a non-smouldering smoke source.

For example, whilst a source of the smoke may generally be detected when the concentration of smoke in the sample of air is above a smoke detection threshold, particular fire sources may be identified as being the source of the smoke when the concentration of smoke exceeds further thresholds. These further thresholds may relate to predetermined concentrations associated with a plurality of known smoke sources. As such, the control module may be configured to identify one of the plurality of known smoke sources as the source of the smoke based on a comparison of the concentration of smoke in the sample of air to one or more additional thresholds.

The source of the smoke may be identified to be one of a non-fire source, a synthetic fire source not comprising fire retardant properties, or a liquid fuel source when the concentration of smoke does not exceed the first smoke threshold.

The source of the smoke may be identified to be one of an organic fire source or a synthetic fire source comprising fire retardant properties when the concentration of smoke in the sample of smoke exceeds the first smoke threshold.

The fire detection system may not be able to discriminate between non-fire sources and fire sources based on the concentration of smoke alone. However, when the identification of the source of the smoke is based on both the concentration of smoke in the sample of air and the concentration of predetermined gas in the sample of air, the source of the smoke may be more precisely determined.

The control module may be configured to identify what type of fire source the source of the smoke is based on whether the source of the smoke is a smouldering smoke source or a non-smouldering smoke source, and based on the fire source identified when comparing the concentration of predetermined gas to the predetermined gas thresholds.

For example, if from the concentration of predetermined gas the fire source is identified to be a synthetic fire source, the synthetic fire source may be further identified as comprising or not comprising fire retardant properties, based on the concentration of smoke in the sample of air. Alternatively, if from the concentration of smoke in the sample of air the fire source is identified to be an organic fire source or a synthetic fire source not comprising fire retardant properties, the fire source may be further identified based on the concentration of predetermined gas in the sample of air.

As such, by basing the identification of the source of the smoke on both the concentration of smoke in the sample of air and the concentration of predetermined gas in the sample of air, the source of the smoke may be more precisely identified.

The concentration of smoke in the sample of air may change over time. The concentration of the predetermined gas in the sample of air may also change over time. The control module may be configured to determine a rate of change of the concentration of carbon monoxide in the sample of air, with respect to time. The control module may be configured to determine a rate of change of the concentration of smoke in the sample of air, with respect to time.

The identification of the source of the smoke may be based on a peak concentration of smoke in the sample of air and a peak concentration of the predetermined gas in the sample of air.

The first predetermined gas threshold, the second predetermined gas threshold and the third predetermined gas threshold may be fixed thresholds. The first smoke threshold may be a fixed threshold.

The identification of the source of the smoke may be based on the concentration of the predetermined gas in the sample of air relative to the concentration of smoke in the sample of air. For example, the control module may be configured to determine a ratio between the concentration of the predetermined gas in the sample of air and the concentration of smoke in the sample of air, and one or more of the thresholds for the predetermined gas may be a ratio threshold, relative to the concentration of smoke in the sample of air. Alternatively, one or more of the thresholds for the predetermined gas may be variable and may be determined based on the concentration of smoke in the sample of air.

The first predetermined gas threshold, the second predetermined gas threshold and the third predetermined gas threshold may be variable thresholds. The first smoke threshold may be a variable threshold.

Identifying whether the source is a non-smouldering source or a smouldering source may be based on the rate of change of the concentration of smoke in the air. Non-smouldering sources may produce smoke faster than smouldering sources. The first smoke threshold may therefore be a rate of change threshold. The source of the smoke may be identified as a non-smouldering source when a rate of change of the concentration of smoke in the sample of air exceeds the first smoke threshold. The source of the smoke may be identified as a smouldering source when a rate of change of the concentration of smoke in the sample of air does not exceed the first smoke threshold.

The control module may be configured to generate an alarm signal based on the identified source of the smoke. For example, if the identified source of the smoke is a non-fire source, the generated alarm signal may not activate a visual indicator and/or an aural indicator. If the identified source of the smoke is a fire source, the generated alarm signal may be activate the aural indicator and/or the visual indicator. The aural indicator may produce different sounds according to the identified fire source. The visual indicator and/or the aural indicator may be part of the fire detection system, or may be part of an alarm system in communication with the fire detection system.

The generated alarm signal may also activate one or more fire mitigation devices based on the identified source of the smoke. The fire mitigation devices may be part of the fire detection system, or may be part of a fire mitigation system in communication with the fire detection system. Fire mitigation devices may include automatic fire extinguishers, such as those which deploy carbon dioxide or CFC foams, or water sprinkler systems. Any electrical mains or gas mains supplied to the monitored environment, if present, may also be switched off or deactivated in response to the alarm signal. The fire mitigation devices and/or techniques employed in response to the alarm signal may differ based on the identified source of the smoke.

The smoke detector may be an optical smoke detector. The smoke detector may comprise a detection chamber into which the sample of air is passed, a laser and a photodiode. The smoke detector may determine a concentration of smoke in the sample of air by measuring an obscuration of the smoke in the detection chamber, or by measuring a scattering of light emitted from the laser.

The gas sensor may be any sensor suitable for determining the concentration of the predetermined gas in the sample of air. The gas sensor may be a biomimetic sensor, a metal oxide semiconductor, or an electrochemical sensor.

The smoke detector and the gas sensor may be arranged so that the sample of air is split, with a portion of the sample of air being provided to each of the smoke detector and the gas sensor. As such the determination of the concentration of smoke may be unaffected by any detection means of the gas sensor, and similarly the determination of the concentration of the predetermined gas may be unaffected by any detection means of the smoke detector. The smoke detector and the gas sensor may be arranged in parallel.

The control module may be in electrical communication with each of the smoke detector and the gas sensor. Alternatively, the control module may be in wireless communication with each of the smoke detector and the gas sensor. The control module may communicate wirelessly with the smoke detector and the gas sensor using any known wireless protocol, such as Wi-Fi, Bluetooth, Infrared or other known wireless communication protocols.

The control module may be located remotely to each of the smoke detector and the gas sensor. Alternatively the control module, the smoke detector and the gas sensor may be located within a housing.

The control module may comprise a processor. The processor may be configured to execute the one or more operations of the control module. The control module may comprise a memory. The processor may execute one or more instructions stored on the memory, to execute the one or more operations of the control module. The control module may be in communication with one or more aural indicators, visual indicators and fire mitigation devices.

The monitored environment may be any building, room or space in which a fire is to be detected. The monitored environment may be any environment which is in fluid communication with the smoke detector and the gas sensor of the fire detection system.

The smoke detector and the gas sensor may be located in the monitored environment such that they are in fluid communication with the monitored environment.

The fire detection system may be a point detection system. The fire detection system may passively sample the air when monitoring the environment, and hence may be regarded as a passive detection system. That is, the fire detection system may rely on the passive movement of air, including smoke and the predetermined gas within the monitored environment, to the gas sensor and the smoke detector.

The fire detection system may alternatively be an aspirating fire detection system. Thus, the smoke detector and the gas sensor may be located remotely from the monitored environment. The fire detection system may comprise a pipe, wherein an opening of the pipe is exposed to the monitored environment. The pipe may also be in fluid communication with the smoke detector and the gas sensor. As such, the pipe may facilitate fluid communication between the smoke detector, the gas sensor and the monitored environment.

Viewed from a second aspect of the present invention, there is provided an aspirating fire detection system including the fire detection system of the first aspect.

The aspirating detection system may comprise an aspirating device. The aspirating device may comprise a fan, blower, pump or the like configured to aspirate air from the monitored environment. The aspirating device may hence be configured to aspirate a sample of air from the monitored environment.

The aspirating detection system may comprise a sampling pipe. The sampling pipe may comprise an opening exposed to the monitored environment. The sampling pipe may facilitate fluid communication between the monitored environment and the smoke detector and the gas sensor. The sampling pipe may also be in fluid communication with the aspirating device, such that air is sampled from the monitored environment by aspirating air from the monitored environment using the sampling pipe.

The aspirating detection system may be regarded as an active detection system. That is, the aspirating detection system may actively sample the air of the monitored environment. Active detection may provide quicker detection times of sources of smoke within a monitored environment, as particulates and gases within the air are motivated to the smoke detector and the gas sensor rather than relying on random processes, such as the stochastic movement of air.

Aspirating detection systems may also provide more reliable detection means than passive detection systems, such as point detection systems. For example, smouldering fires may produce large amounts of dense smoke. As smouldering fires may not produce large amounts of heat, the smoke and other combustion products from the source of the smoke may not be motivated to a ceiling or sampling point and/or detector located above the point at which the smoke hangs in the air. However, the aspirating detection system may aspirate and/or motivate the low hanging smoke such that it does reach the smoke detector and the gas sensor, such that a source of smoke is reliably detected, and the source of the smoke may be identified.

Further, aspirating detection systems may monitor larger areas more reliably, as air is motivated to the smoke detector and gas sensor. That is, a time of travel between a fire and the various detectors within the aspirating detection system is reduced, such that fires may be reliably detected across vaster areas.

The system of the second aspect may be configured to perform any one or more or all of the features, including optional features, of the system of the first aspect. Thus the above description of the system of the first aspect may be equally applicable to the system of the second aspect.

Viewed from a third aspect of the present invention, there is provided a method of determining a source of smoke in a monitored environment, the method comprising: determining a concentration of smoke in a sample of air from the monitored environment; determining a concentration of a predetermined gas in the sample of air, wherein the predetermined gas is one of carbon monoxide, carbon dioxide, nitrogen dioxide or sulphur dioxide; and identifying a source of the smoke based on the concentration of smoke and the concentration of the predetermined gas; wherein the source of the smoke is identified to be a non-fire source when the concentration of the predetermined gas in the sample of air does not exceed a first threshold.

By determining the concentrations of both smoke and at least one of these predetermined gases in the sample of air from the monitored environment, the method is capable both detecting smoke and identifying what the source of the smoke may be, if detected. In particular, the predetermined gas being one of carbon monoxide, carbon dioxide, nitrogen dioxide and sulphur dioxide means that many potential sources of the smoke may be distinguished based on the concentration of the predetermined gas determined, given that varying sources produce differing concentrations of the predetermined gas during combustion.

Advantageously, it has been recognised that a non-fire smoke source will typically produce a detectably lower concentration of these predetermined gases in the air than a fire source. Therefore, non-fire or nuisance sources may be readily discriminated from fire sources, or sources which require action. As such the method may be reliable in its detection of fires, such that occupants of the monitored environment or the like may not be alerted to non-fire sources, or nuisance sources.

Determining a concentration of smoke in the sample of air may be a first step, or a detecting step, in which a fire is detected. Determining a concentration of the predetermined gas in the sample of air may be part of a second step, or a discriminating step, in which the method involves identifying the source of the smoke based on the concentration of smoke and the concentration of the predetermined gas.

The method may comprise detecting a possible fire event, e.g. the production of smoke via combustion, following the detection of smoke, but a response of to the detection of smoke may differ according to the identified source of the smoke.

The predetermined gas is one of carbon monoxide, carbon dioxide, nitrogen dioxide and sulphur dioxide. Each of these gases may be produced in varying amounts by different sources of smoke during combustion. Each of these gases are generally produced in low concentrations by non-fire, or nuisance, sources. Thus whilst detecting smoke using the smoke detector may simply detect a fire, identifying the source of the smoke based on the concentration of the predetermined gas in the sample of air provides further signals or characteristics of the source of the smoke which may be used to identify the source of the smoke.

The method may comprise comparing the concentration of smoke and the concentration of the predetermined gas to a plurality of predetermined concentrations associated with a plurality of known smoke sources. The method may comprise selecting one of the plurality of known smoke sources as the source of the smoke based on the comparison.

Determining a concentration of the predetermined gas in the sample of air may allow for the identifying of the source of the smoke by discriminating between known sources according to concentrations of the predetermined gas that the known sources produce during combustion. The concentrations of the predetermined gas that the known sources produce may be found experimentally.

Selecting one of the plurality of known smoke sources as the source of the smoke may be based on a number of criteria. For example, comparing the concentration of smoke and the concentration of the predetermined gas to predetermined concentrations associated with a plurality of known smoke sources may comprise comparing the determined concentrations in the sample of air to threshold values of the predetermined concentrations associated with the plurality of known smoke sources. When the determined concentration of smoke and the determined concentration of predetermined gas are found to lie within a range of values associated and/or corresponding to the predetermined concentrations of one of the plurality of known sources, that known source may be selected as the source of the smoke. The ranges of values associated with the predetermined concentrations of each of the plurality of known sources may be defined by upper and lower concentration thresholds. Alternatively, the selection may comprise selecting one of the plurality of known smoke sources of which the predetermined concentrations are closest in value to the concentration of smoke and the concentration of predetermined gas in the sample of air.

The concentration of smoke determined in the sample of air and/or the concentration of predetermined gas in the sample of air may be determined to a precision of at least ±2%; ±5%±8% or ±10%. The concentration of smoke determined in the sample of air and/or the concentration of predetermined gas in the sample of air may be determined to a precision of at least: ±0.05 ppm; ±0.10 ppm; ±0.15 ppm or ±0.20 ppm. The concentration of smoke determined in the sample of air may be determined to a sensitivity of at least: ±0.001% obs/m; ±0.002% obs/m; ±0.003% obs/m; ±0.004% obs/m or ±0.005% obs/m. Alternatively, the concentration of smoke and/or the concentration of predetermined gas in the sample of air may be determined to be above a set value according to a threshold response of the respective detector and/or sensor used to determine the respective concentration.

The method may comprise identifying the source of the smoke as a fire source when the concentration of the predetermined gas in the sample of air exceeds the first threshold.

The method may comprise identifying if the source of the smoke is a fire source. The method may also comprise identifying what type of fire source the source of the smoke is. The method may comprise identifying what type of fire source the source of the smoke is based on the concentration of the predetermined gas.

For example, whilst a fire source may be generally identified when the concentration of the predetermined gas in the sample of air is above the first threshold, particular fire sources may be identified as being the source of the smoke when the concentration of the predetermined gas exceeds further thresholds. These further thresholds may relate to predetermined concentrations associated with a plurality of known smoke sources. As such, the method may comprise identifying one of the plurality of known smoke sources as the source of the smoke based on a comparison of the concentration of the predetermined gas in the sample of air to one or more additional thresholds.

The method may comprise identifying the source of the smoke to be an organic fire source when the concentration of the predetermined gas in the sample of air exceeds the first threshold and does not exceed a second threshold. The second threshold may be greater than the first threshold.

The method may comprise identifying the source of the smoke to be a liquid fuel source when the concentration of the predetermined gas in the sample of air exceeds the second threshold and does not exceed a third threshold. The third threshold may be greater than the second threshold.

The method may comprise identifying the source of the smoke to be a synthetic fire source when the concentration of the predetermined gas in the sample of air exceeds the third threshold.

By discriminating not only between fire sources and non-fire sources, but also between different types of fire source based on the concentration of predetermined gas, the method may be capable of identifying specific fire sources as being the source of the smoke. Accordingly, appropriate action in response to the detection of smoke, and potentially a fire source, may be undertaken sooner after the fire started. The safety of the monitored environment may be improved, and damage caused whilst determining an appropriate response to a fire may be mitigated.

The method may generally comprise detecting a source of the smoke when a determined concentration of smoke exceeds a smoke detection threshold.

The method comprises identifying the source of the smoke based on the concentration of smoke in the sample of air, as well as the concentration of the predetermined gas in the sample of air. The concentration of smoke in the sample of air may be used to at least in part identify the source of the smoke in a number of ways.

For example, the method may comprise identifying the source of the smoke at least in part by determining a presence a presence of the source of the smoke, based on the concentration of smoke in the sample of air. Additionally or alternatively, the method may comprise identifying the source of the smoke based at least in part on whether the concentration of smoke in the sample of air exceeds one or more smoke thresholds. For example, smouldering fires, i.e. fires which produce smoke without a flame, may produce greater amounts of smoke than non-smouldering fires. Smouldering fires may be produced by organic materials. Smouldering fires may also be produced by synthetic materials comprising fire retardant materials or synthetic materials which have undergone fire retardant treatments. Thus the method may comprise discriminating between certain non-fire sources and certain fire sources based on the concentration of smoke in the sample of air.

The method may comprise identifying the source of the smoke to be a smouldering smoke source when the concentration of smoke in the sample of air exceeds a first smoke threshold. The method may comprise identifying the source of the smoke to be a non-smouldering smoke source when the concentration of smoke in the sample of air does not exceed the first smoke threshold. The first smoke threshold may be greater than the smoke detection threshold.

The method may comprise identifying if the source of the smoke is a smouldering smoke source. The method may comprise identifying if the source of the smoke is a non-smouldering smoke source.

For example, whilst the method may comprise generally detecting a source of the smoke when the concentration of smoke in the sample of air is above a smoke detection threshold, particular fire sources may be identified as being the source of the smoke when the concentration of smoke exceeds further thresholds. These further thresholds may relate to predetermined concentrations associated with a plurality of known smoke sources. As such, the method may comprise identifying one of the plurality of known smoke sources as the source of the smoke based on a comparison of the concentration of smoke in the sample of air to one or more additional thresholds.

The method may comprise identifying the source of the smoke to be one of a non-fire source, a synthetic fire source not comprising fire retardant properties, or a liquid fuel source when the concentration of smoke does not exceed the first smoke threshold.

The method may comprise identifying the source of the smoke to be one of an organic fire source or a synthetic fire source comprising fire retardant properties when the concentration of smoke in the sample of smoke exceeds the first smoke threshold.

The method may not be able to discriminate between non-fire sources and fire sources based on the concentration of smoke alone. However, when the identification of the source of the smoke is based on both the concentration of smoke in the sample of air and the concentration of predetermined gas in the sample of air, the source of the smoke may be more precisely determined.

The method may comprise identifying what type of fire source the source of the smoke is based on whether the source of the smoke is a smouldering smoke source or a non-smouldering smoke source, and based on the fire source identified when comparing the concentration of predetermined gas to the predetermined gas thresholds.

For example, if from the concentration of predetermined gas the fire source is identified to be a synthetic fire source, the synthetic fire source may be further identified as comprising or not comprising fire retardant properties, based on the concentration of smoke in the sample of air. Alternatively, if from the concentration of smoke in the sample of air the fire source is identified to be an organic fire source or a synthetic fire source not comprising fire retardant properties, the fire source may be further identified based on the concentration of predetermined gas in the sample of air.

As such, by identifying the source of the smoke based on both the concentration of smoke in the sample of air and the concentration of predetermined gas in the sample of air, the source of the smoke may be more precisely identified.

The concentration of smoke in the sample of air may vary with time. The concentration of the predetermined gas in the sample of air may also vary with time.

The method may comprise identifying the source of the smoke based on a peak concentration of smoke in the sample of air and a peak concentration of the predetermined gas in the sample of air.

The first predetermined gas threshold, the second predetermined gas threshold and the third predetermined gas threshold may be fixed thresholds. The first smoke threshold may be a fixed threshold.

The method may comprise identifying the source of the smoke based on the concentration of the predetermined gas in the sample of air relative to the concentration of smoke in the sample of air. For example, the method may comprise determining a ratio between the concentration of the predetermined gas in the sample of air and the concentration of smoke in the sample of air, and one or more of the thresholds for the predetermined gas may be a ratio threshold, relative to the concentration of smoke in the sample of air. Alternatively, one or more of the thresholds for the predetermined gas may be variable and may be determined based on the concentration of smoke in the sample of air.

The first predetermined gas threshold, the second predetermined gas threshold and the third predetermined gas threshold may be variable thresholds. The first smoke threshold may be a variable threshold.

The method may comprise generating an alarm signal based on the identified source of the smoke. For example, if the identified source of the smoke is a non-fire source, the generated alarm signal not activate a visual indicator and/or an aural indicator. If the identified source of the smoke is a fire source, the generated alarm signal may activate the aural indicator and/or the visual indicator. The aural indicator may produce different sounds according to the identified fire source.

The method may also comprise activating one or more fire mitigation devices based on the identified source of the smoke. Fire mitigation devices may include automatic fire extinguishers, such as those which deploy carbon dioxide or CFC foams, or water sprinkler systems. Any electrical mains or gas mains supplied to the monitored environment, if present, may also be switched off or deactivated. The fire mitigation devices and/or techniques employed may be activated in response to the generated alarm signal and may differ based on the identified source of the smoke.

The method of the second aspect may comprise using the fire detection system of the first aspect, or the aspirating detection system of the second aspect.

The method of the third aspect may comprise performing steps relating to or using any one or more or all of the features, including optional features, of the systems described above. Thus the above description of the fire detection system of the first aspect and the aspirating detection system of the second aspect may be equally applicable to the method of the third aspect.

BRIEF DESCRIPTION OF THE DRAWINGS

Certain exemplary embodiments of the disclosure will now be described by way of example only and with reference to the accompanying drawings in which.

DETAILED DESCRIPTION

Figure 1:
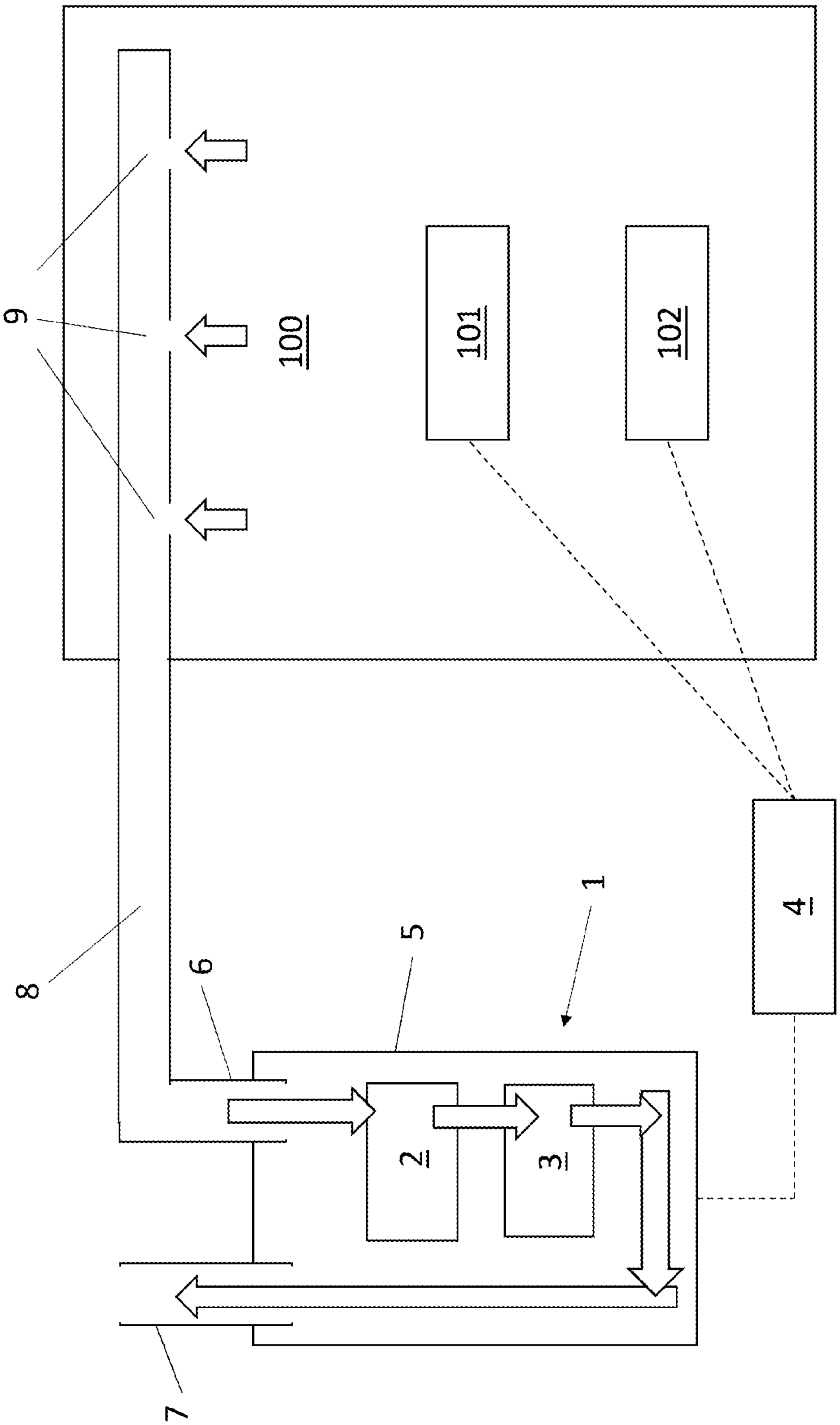
FIG. 1 shows a schematic diagram of a fire detection system.

FIG. 1 shows a schematic diagram of an aspirating fire detection system 1 monitoring an environment 100. The fire detection system 1 includes a central detection unit 5 connected to a sampling pipe 8. The sampling pipe 8 is exposed to the monitored environment 100 via a plurality of sampling holes 9 in the sample pipe 8, such that the central detection unit 5 is in fluid communication with the monitored environment 100. The central detection 5 is in wired and/or wireless communication with a control module 4. The control module 4 is also in wired and/or wireless communication with an alarm system 101 and a fire mitigation device 102, both of which are present in the monitored environment 100.

The central detection unit 5 includes an inlet 6 which is connected to the sampling pipe 8. The central detection unit 5 also includes a gas sensor 2, a smoke detector 3 and an outlet 7. Air is aspirated into the central detection unit 5 using an aspirator (not shown), which draws a sample of air from the monitored environment through the sampling pipe 8 and into the central detection unit 5 via the inlet 6. The sampled air is passed to each of the gas sensor 2 and the smoke detector 3. The sampled air is then exhausted from the central detection unit 5 via the outlet 7. The flow of air through the central detection unit 5 is generally indicated by the arrows shown in FIG. 1.

Figure 2A:
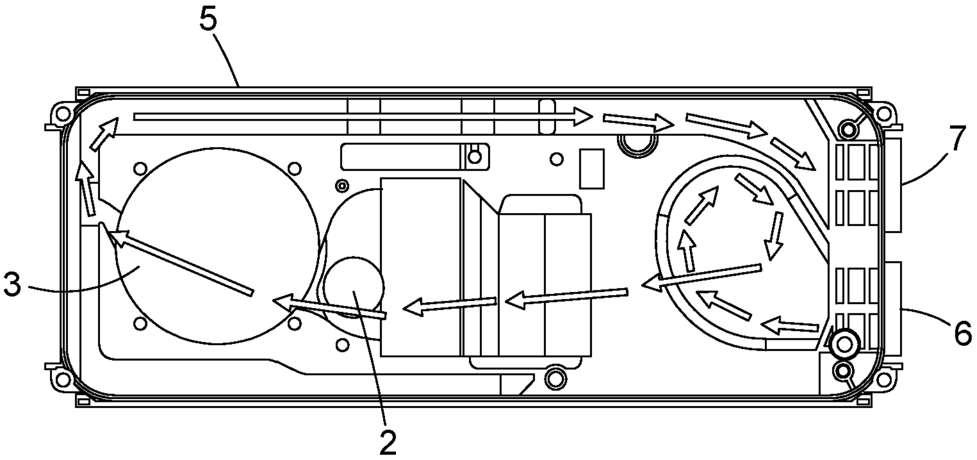
FIG. 2A shows a cross-sectional view of a central detection unit of the fire detection system.
Figure 2B:
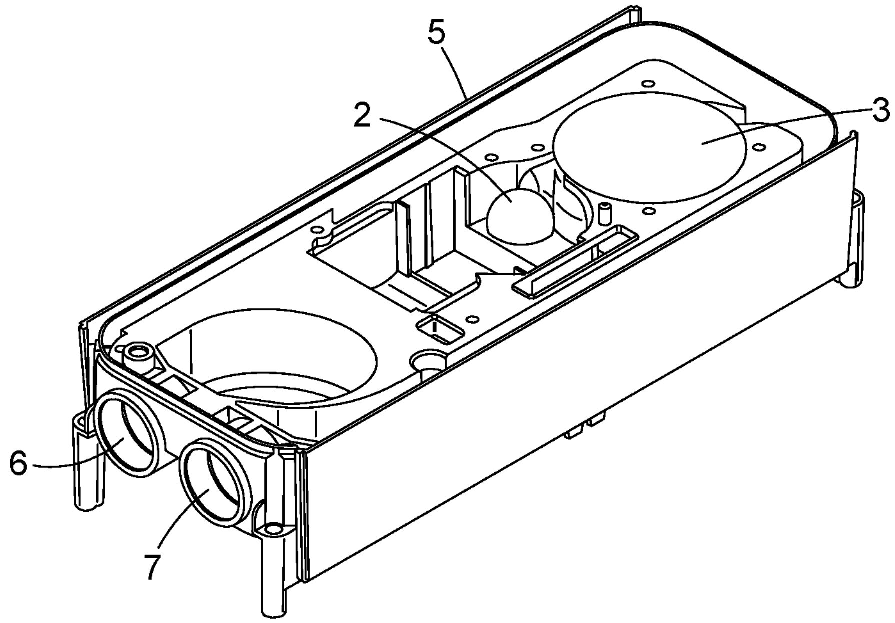
FIG. 2B shows a perspective, cutaway view of the central detection unit of fire detection system shown in FIG. 2A.

FIGS. 2A and 2B illustrate the central detection unit 5 of the fire detection system 1. The gas sensor 2 and the smoke detector 3 are housed within a housing of the central detection unit 5.

The arrows in FIG. 2A indicate a general flow of the air sampled through the housing of the central detection unit 5. Aspirated air is motivated into the central detection unit 5 due to the rotation of an impeller of the aspirator (not shown). The aspirated air is then passed to the gas sensor 2 and the smoke detector 3, before being exhausted from the housing via the outlet 7. Whilst not illustrated in the present embodiment, not all of the air is necessarily passed through both the smoke detector 3 and/or the gas sensor 2. The air may be split such that different portions of the sampled air are passed to each of the smoke detector 3 and the gas sensor 2. Optionally a bypass flow may be present, such that a portion of the sampled air is not passed through the smoke detector 3 and/or the gas sensor 2, for example if the flow rate of the aspirator is greater than the flow rates that can be effectively processed by the smoke detector 3 and/or the gas sensor 2.

The smoke detector 3 is configured to determine a concentration of smoke in a sample of air from the environment 100 which the fire detection system 1 monitors. The smoke detector 3 in the illustrated embodiment is an optical smoke detector and comprises a detection chamber into which the sample of air is passed, a laser which is shone through the detection chamber, and a photodiode. If smoke is present in the detection chamber, the laser light will be scattered. The photodiode detects the scattered light such that an amount of scattered light can be measured. By measuring an amount of scattered light from the laser, a concentration of smoke present in the sample of air can be determined.

The fire detection system 1 is employed to detect a fire. The fire detection system 1 primarily does this by detecting smoke in the monitored environment 100 using the smoke detector 3. However, the smoke detector 3 may detect smoke from non-fire sources which are expected to be present in the monitored environment 100, such as cooking sources. The smoke from a cooking source may be indistinguishable from smoke from fire sources against which action should be taken. As such, detecting smoke using the smoke detector 2 alone is not sufficient to distinguish between non-fire, or nuisance, sources and fire sources.

Different sources of smoke produce different amounts of certain gases during combustion. Gases produced during combustion commonly include carbon monoxide, carbon dioxide, nitrogen dioxide and sulphur dioxide. In the present embodiment, the gas sensor 2 is provided to determine a concentration of carbon monoxide in the sample of air from the monitored environment 100.

Cooking sources and the like produce lower amounts of carbon monoxide during combustion than other common fire sources. As such determining the concentration of carbon monoxide using the gas sensor 2 and comparing the concentration to a threshold value at which fire sources produce quantities of carbon monoxide enables the fire detection system 1 to be able to discriminate between non-fire sources and fire sources, upon initially detecting the source of smoke using the smoke detector 3.

By being able to differentiate between non-fire sources and fire sources, alarms relating to the detection of smoke may only be raised by the fire detection system 1 when a fire source is detected. This reduces the incidence of nuisance alarms, and increase the reliability of the fire detection system 1.

The measurements of the concentration of smoke in the sample of air, determined by the smoke detector 3, and the concentration of carbon monoxide in the sample of air, determined by the gas sensor 2, are passed to the control module 4. Based on the concentration of smoke and the concentration of carbon monoxide in the sample of air, the control module 4 is configured to identify the source of the smoke. The criteria used by the control module 4 in identifying the source of the smoke based on the concentration of smoke and the concentration of carbon monoxide in the sample of air are discussed in further detail below.

Figure 3A:
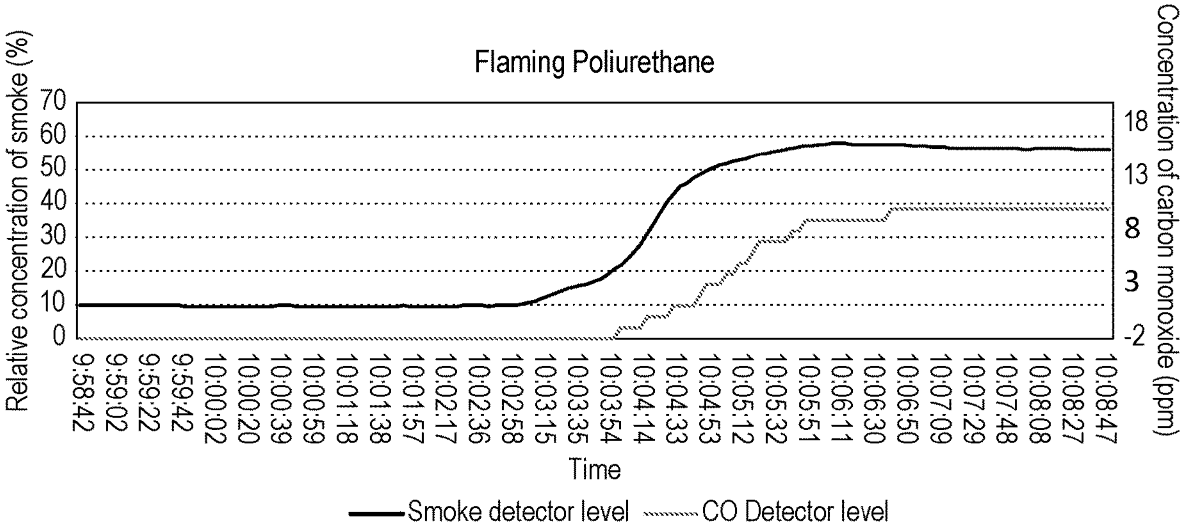
FIGS. 3A to 3C show graphs of how a concentration of smoke in a sample of air and how a concentration of carbon monoxide in a sample of air changes over time during combustion of various compounds.
Figure 3B:
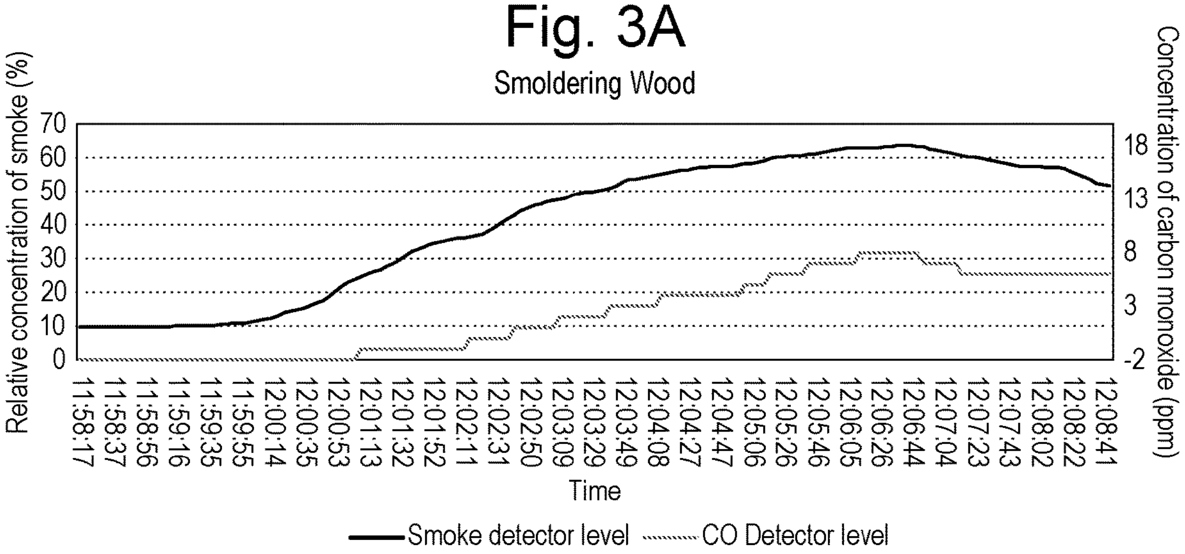
Figure 3C:
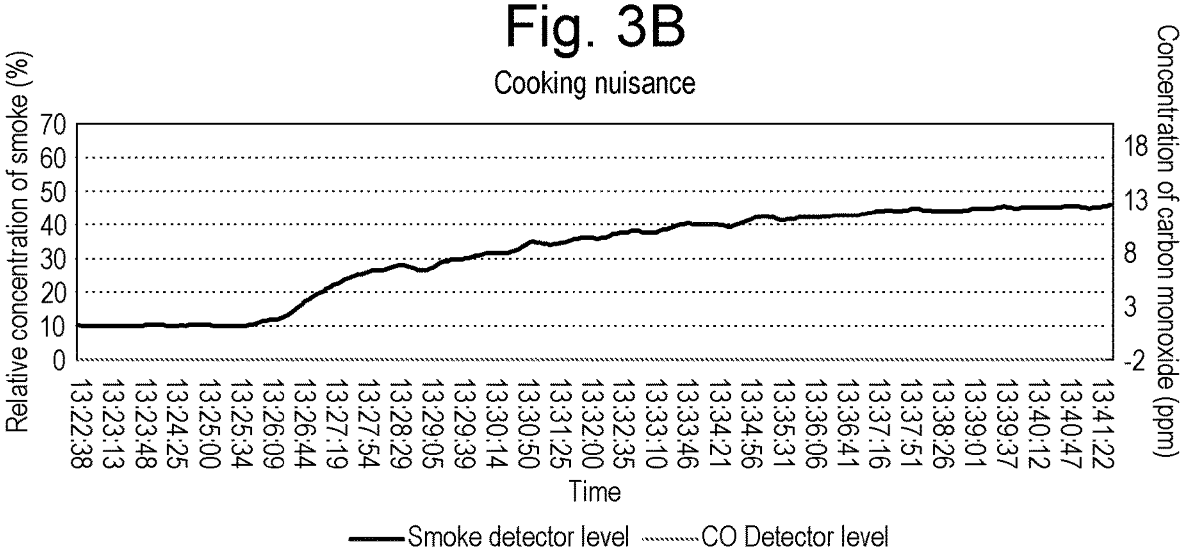

FIGS. 3A to 3C illustrate graphs of how a relative concentration of smoke (%) in a sample of air determined by the smoke detector 3 and the concentration of carbon monoxide (ppm) in the sample of air, determined by the gas sensor 2, varied with time for a plurality of different sources of smoke in test conditions. A 60% relative concentration of smoke in the sample of air is equivalent to an obscuration of 3% obs/m.

FIG. 3A shows how the relative concentration of smoke and the concentration of carbon monoxide determined varies for non-smouldering polyurethane, i.e. polyurethane that has not been treated by any flame retardants and hence combusts with a flame, in test conditions. As can be seen in FIG. 3A, a peak relative concentration of smoke is determined as approximately 58% and a peak concentration of carbon monoxide is determined as approximately 10 ppm. The graph for non-smouldering polyurethane is exemplary for most synthetic materials which have not been treated with fire retardants.

FIG. 3B shows how the relative concentration of smoke and the concentration of carbon monoxide determined varies for smouldering wood, i.e. wood that burns without a flame, in test conditions. As can be seen in FIG. 3B, a peak relative concentration of smoke is determined to be approximately 64% and a peak concentration of carbon monoxide is determined to be approximately 8. The graph for smouldering wood is exemplary for most organic materials.

FIG. 3C shows how the relative concentration of smoke and the concentration of carbon monoxide determined varies for a cooking nuisance, in test conditions. As can be seen in FIG. 3C, a peak relative concentration of smoke is determined to be approximately 46% and a concentration of carbon monoxide is not effectively registered, i.e. the concentration of carbon monoxide produced is negligible. The graph for the cooking nuisance is exemplary for most other cooking sources, or other nuisance sources.

Figure 4:
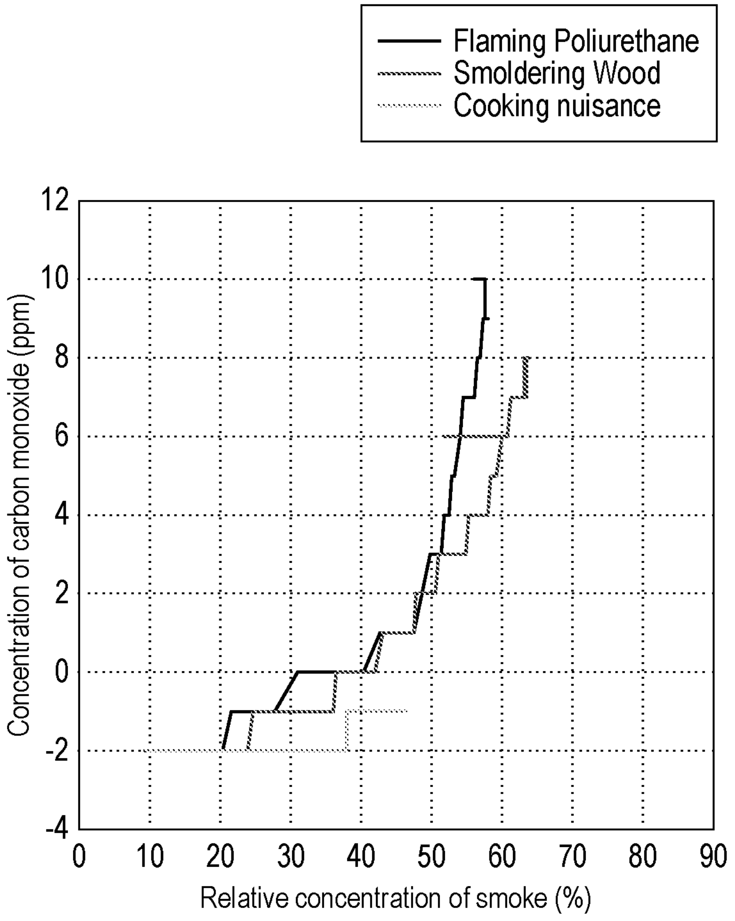
FIG. 4 shows a graph comparing how a concentration of carbon monoxide in a sample of air varies versus a concentration of smoke in a sample of air for various compounds.

FIG. 4 shows how the measured concentration of carbon monoxide in a sample of air (y-axis) correlates to the measured relative concentration of smoke in the sample of air (x-axis) in test conditions for each of the three examples shown in FIGS. 3A to 3C, namely cooking nuisance, smouldering wood and non-smouldering polyurethane.

As can be seen from the graphs shown in FIGS. 3A to 3C and FIG. 4, in the tests each source produces a detectable relative concentration of smoke. However, the concentration of carbon monoxide measured for each source differs. In particular, there is a significant difference in the amount of carbon monoxide produced by a cooking nuisance source compared to smouldering wood and/or non-smouldering polyurethane during combustion. There is a different rate of change with respect to time of the determined concentration of carbon monoxide in the sample of air and a different rate of change with respect to time of the determined relative concentration of smoke in the sample of air for each source (see FIGS. 3A to 3C). There is a different determined concentration of carbon monoxide in the sample of air relative to the determined relative concentration of smoke in the sample of air for each source (see FIG. 4). There is also a different peak relative concentration of smoke in the sample of air determined for each source, and a different peak concentration of carbon monoxide in the sample of air determined for each source (see FIGS. 3A to 3C and FIG. 4).

The control module is configured to identify that the source of the smoke is a non-fire source when the concentration of carbon monoxide in the sample of air does not exceed a first carbon monoxide threshold. As such, by determining a concentration of carbon monoxide in the sample of air, the fire detection system 1 is able to discriminate between non-fire sources and fire sources based on the determined concentrations of smoke and carbon monoxide in the sample of air.

The relative concentration of smoke and the concentration of carbon monoxide produced by the sources shown in FIGS. 3A to 3C and FIG. 4 are a selection of known sources of smoke from a plurality of many known sources. Known sources of smoke may be generally classified based on the concentration of smoke and the concentration of carbon monoxide they produce during combustion. The determined concentrations of smoke and carbon monoxide in the sample of air are compared to these predetermined concentrations, and the source of the smoke is selected as being one of these known sources based on the comparison.

The control module 4 is configured to compare the concentration of carbon monoxide in the sample of air with one or more carbon monoxide thresholds. As discussed above, if the concentration of carbon monoxide in the sample of air does not exceed the first carbon monoxide threshold, the source of the smoke may be identified as a non-fire source. If the concentration of carbon monoxide in the sample of air exceeds the first carbon monoxide threshold the source of the smoke is identified as a fire source. Further carbon monoxide thresholds and smoke thresholds are also used to further identify what the fire source is. Thresholds dependent on a concentration of carbon monoxide relative to a concentration of smoke are used by the control module 4 to discriminate between fire sources.

| Source of smoke | Concentration of carbon monoxide relative to concentration of smoke; [CO]/[smoke] |
|---|---|
| Non-fire source | [CO]/[smoke] < first [CO]/[smoke] threshold |
| Organic fire source | First [CO]/[smoke] threshold < [CO]/[smoke] < second [CO]/[smoke] threshold |
| Liquid fuel source | Second [CO]/[smoke] threshold < [CO]/[smoke] < Third [CO]/[smoke] threshold |
| Synthetic source | Third [CO]/[smoke] threshold < [CO]/[smoke] |

Table 1 shows how the source of the smoke may be identified based on the concentration of carbon monoxide in the sample of air relative to the concentration of smoke in the sample of air. The control module 4 determines a concentration of carbon monoxide in the sample of air relative to a concentration of smoke in the sample of air. The control module 4 then compares this value to a number of thresholds. The source of the smoke is identified according to the result of the comparison.

By basing the identification of the source of the smoke on the concentration of carbon monoxide in the sample of air, the fire detection system 1 can discriminate between various sources of smoke, particularly between non-fire sources and fire sources. By basing the identification of the source of the smoke on the concentration of carbon monoxide in the sample of air relative to the concentration of smoke in the sample of air, the fire detection system 1 can discriminate further between different fire sources, which produce different concentrations of carbon monoxide relative to a concentration of smoke produced during combustion.

The control module 4 generates an alarm signal according to the source of the smoke identified. The generated alarm signal varies according to the source of the smoke identified, and as such the fire detection system 1 produces different responses according the source of smoke identified. The alarm signal is communicated to the alarm system 101.

The alarm system 101 includes an aural indicator, such as a siren, bell or the like to alert occupants in the monitored environment 100. The alarm system 102 also comprises a display panel indicating the status of the fire detection system 1. If the source of the smoke is identified to be a non-fire source, the generated alarm signal does not activate the aural indicator, but is acknowledged as a textual message displayed on the display panel. If the source of the smoke is identified to be a fire source, the alarm signal activates the aural indicator so that the occupants of the monitored environment 100 are alerted to the presence of the fire source. The display panel also acknowledges the fire source, and any further indication of what the identified fire source is.

The generated alarm signal can also activate a fire mitigation device 102 located in the monitored environment 100, such as an automated fire extinguisher or a sprinkler system, when a fire source is identified.

Whilst the gas sensor 2 has been discussed herein as determining a concentration of carbon monoxide in the sample of air, the gas sensor 2 could be configured to determine a concentration of carbon dioxide, nitrogen dioxide or sulphur dioxide instead. As discussed above, these gases are also commonly emitted by fire sources of smoke, but are typically present only in low concentrations from non-fire sources of smoke.

What is claimed is:

1. A fire detection system for monitoring a monitored environment, the system comprising:

a smoke detector configured to determine a concentration of smoke in a sample of air from the monitored environment;

a gas sensor configured to determine a concentration of a predetermined gas in the sample of air, wherein the predetermined gas is one of carbon monoxide, carbon dioxide, nitrogen dioxide and sulphur dioxide; and a control module in communication with the smoke detector and the gas sensor, the control module being configured to identify a source of the smoke based on the concentration of smoke and the concentration of the predetermined gas;

wherein the source of the smoke is identified to be a non-fire source when the concentration of the predetermined gas in the sample of air is below a first threshold;

wherein the source of the smoke is identified to be a fire source when the concentration of the predetermined gas in the sample of air exceeds the first threshold;

wherein the control module is configured to compare the concentration of smoke and the concentration of the predetermined gas to predetermined concentrations associated with a plurality of known fire sources; and wherein the control module is configured to identify one of the plurality of known fire sources as the source of the smoke based on the comparison.

2. The fire detection system as claimed in claim 1, wherein the source of the smoke is identified to be:

an organic fire source when the concentration of the predetermined gas in the sample of air exceeds the first threshold and does not exceed a second threshold, wherein the first threshold is less than the second threshold; or a liquid fuel fire source when the concentration of the predetermined gas in the sample of air exceeds the second threshold and does not exceed a third threshold, wherein the second threshold is less than the third threshold; or a synthetic fire source when the concentration of the predetermined gas in the sample of air exceeds the third threshold.

3. The fire detection system as claimed in claim 1, wherein the control module (4) is configured to generate an alarm signal based on the identified source of the smoke.

4. The fire detection system according to claim 1, wherein the fire detection system is an aspirating fire detection system.

5. A method of determining a source of smoke in a monitored environment, the method comprising:

determining a concentration of smoke in a sample of air from the monitored environment;

determining a concentration of a predetermined gas in the sample of air, wherein the predetermined gas is one of carbon monoxide, carbon dioxide, nitrogen dioxide or sulphur dioxide;

identifying a source of the smoke based on the concentration of smoke and the concentration of the predetermined gas;

wherein the source of the smoke is identified to be a non-fire source when the concentration of the predetermined gas in the sample of air does not exceed a first threshold; and wherein the source of the smoke is identified to be a fire source when the concentration of the predetermined gas in the sample of air exceeds the first threshold;

comparing the concentration of smoke and the concentration of the predetermined gas to predetermined concentrations associated with a plurality of known fire sources; and identifying one of the plurality of known fire sources as the source of the smoke based on the comparison.

6. The method as claimed in claim 5, the method comprising:

comparing the concentration of the predetermined gas in the sample of air to each of: the first threshold, a second threshold greater than the first threshold but less than a third threshold, and the third threshold;

wherein the source of the smoke is identified to be:

an organic fire source when the concentration of the predetermined gas in the sample of air exceeds the first threshold and does not exceed the second threshold; or a liquid fuel fire source when the concentration of the predetermined gas in the sample of air exceeds the second threshold and does not exceed the third threshold; or a synthetic fire source when the concentration of the predetermined gas in the sample of air exceeds the third threshold.

7. The method as claimed in claim 5, the method comprising:

generating an alarm signal based on the source of the smoke.

* * * * *